United States Patent
Mochary et al.

(10) Patent No.: US 7,676,366 B2
(45) Date of Patent: Mar. 9, 2010

(54) ADAPTATION OF SYMBOLS

(75) Inventors: Ran Mochary, Tel Aviv (IL); Sasi Solomon, Herzlia (IL); Tal El-Hay, Ramat Gan (IL); Tal Yadid, Ramat Hasharon (IL); Itamar Bartur, Rehovot (IL)

(73) Assignee: Art Advanced Recognition Technologies Inc., Lawrenceville, GA (US)

( * ) Notice: Subject to any disclaimer, the term of this patent is extended or adjusted under 35 U.S.C. 154(b) by 1279 days.

(21) Appl. No.: 10/340,841

(22) Filed: Jan. 13, 2003

(65) Prior Publication Data

US 2004/0138893 A1    Jul. 15, 2004

(51) Int. Cl.
*G10L 15/00* (2006.01)
*G10L 15/04* (2006.01)

(52) U.S. Cl. .................. 704/251; 704/244; 704/275; 704/235; 704/277

(58) Field of Classification Search ............... 704/244, 704/277, 235, 251, 275
See application file for complete search history.

(56) References Cited

U.S. PATENT DOCUMENTS

| | | | |
|---|---|---|---|
| 5,027,406 A | | 6/1991 | Robert et al. |
| 5,675,704 A | * | 10/1997 | Juang et al. .................. 704/246 |
| 5,835,890 A | * | 11/1998 | Matsui et al. ............... 704/255 |
| 5,850,627 A | | 12/1998 | Gould et al. |
| 5,864,810 A | * | 1/1999 | Digalakis et al. ............ 704/255 |
| 6,078,884 A | * | 6/2000 | Downey ...................... 704/243 |
| 6,101,468 A | | 8/2000 | Gould et al. |
| 6,163,768 A | | 12/2000 | Sherwood et al. |
| 6,205,426 B1 | * | 3/2001 | Nguyen et al. .............. 704/255 |
| 6,208,964 B1 | * | 3/2001 | Sabourin ..................... 704/254 |
| 6,212,498 B1 | | 4/2001 | Sherwood et al. |
| 6,272,462 B1 | * | 8/2001 | Nguyen et al. .............. 704/244 |
| 6,442,519 B1 | * | 8/2002 | Kanevsky et al. ........... 704/243 |
| 6,535,849 B1 | * | 3/2003 | Pakhomov et al. .......... 704/235 |
| 6,587,824 B1 | * | 7/2003 | Everhart et al. ............. 704/243 |
| 6,961,702 B2 | * | 11/2005 | Dobler et al. ................ 704/244 |
| 6,973,428 B2 | * | 12/2005 | Boguraev et al. ........... 704/251 |
| 2001/0039492 A1 | * | 11/2001 | Nemoto ....................... 704/231 |
| 2002/0091518 A1 | * | 7/2002 | Baruch et al. ............... 704/231 |
| 2004/0088162 A1 | * | 5/2004 | He et al. ...................... 704/235 |

OTHER PUBLICATIONS

Nguyen et al. "N-Best Based Supervised and Unsupervised Adaptation for Native and Non-Native Speakers in Cars," Proc. IEEE ICASSP Mar. 1999, vol. 1, pp. 173-176.*

Thelan et al. "Speaker Adaptation in the Philips System for Large Vocabulary Continuous Speech Recognition," Proc. ICASSP 1997, vol. 2, pp. 1035-1038.*

P.C. Woodland, "Speaker Adaptation: Techniques And Challenges", Proc. IEEE Workshop on Automatic-Speech-Recognition Understanding, 2000, pp. 85-90., USA.

(Continued)

*Primary Examiner*—Angela A. Armstrong
(74) *Attorney, Agent, or Firm*—Chapin IP Law, LLC

(57) ABSTRACT

A speaker adaptation system and method for speech models of symbols displays a multi-word symbol to be spoken as a symbol. The supervised adaptation system and method has unsupervised adaptation for multi-word symbols, limited to the set of words associated with each multi-word symbol.

17 Claims, 7 Drawing Sheets

OTHER PUBLICATIONS

P.C. Woodland, "Speaker Adaptation for Continuous Density HMMs: A Review", Adaptation Methods for Automatic Speech Recognition, Aug. 2001, pp. 11-19, USA.

M.J.F. Gales and P.C. Woodland, "Mean And Variance Adaptation Within The MLLR Frame Work", Computer Speech & Language, vol. 10, pp. 249-264, 1996, USA.

Chin-Hui Lee, Frank K. Soong, Kuldip K. Paliwal, Automatic Speech And Speaker Recognition—Advanced Topics, Chapter 4, section 3, pp. 88-90, U.K., (1996).

Huang, Acero, and Hon, Spoken Language Processing, pp. 608-612, U.K., (2001).

L. Rabiner and B.H Juang, Fundamentals Of Speech Recognition, pp. 414-415, 425-430, U.K., (1993).

* cited by examiner

ZERO 3-642-7242

03-64 ZWEI-7 ZWEI 4 ZWEI

FIG.1

PRIOR ART

ADAPTATION OF SYMBOLS

FIELD OF THE INVENTION

The present invention relates to speech recognition generally and to adaptation of reference models in particular.

BACKGROUND OF THE INVENTION

Speech recognition is known in the art. Limited vocabulary speech recognizers operate by matching the incoming speech to a collection of reference speech models and selecting the reference model(s) which best match(es) the incoming speech. Many speech recognition systems operate with a collection of reference words created from a large number of speakers. However, since the user may have his own way of pronouncing certain words, many speech recognition systems also have adaptation systems which adapt the reference models to more closely match the users' way of speaking During an adaptation session, the system displays the words the user should say and records how the user says each word. This is known as a "supervised" adaptation process since the speech recognizer knows the word the user will say. The speech recognizer then adapts its reference models to incorporate the user's particular way of saying the words. Once the adaptation session has finished, the system is ready to recognize any word which the user may decide to say.

Speech recognizers are typically limited to a particular vocabulary set. By limiting the vocabulary set, the recognizer will have a high level of recognition. One common vocabulary set is the set of digits.

Unfortunately, some digits have two or more ways of saying them. For example, in English, one can say "zero" or "oh" for the digit "0". In German, the digit "2" is pronounced "zwei" or "zwo" and in Chinese there are digits with up to four different pronunciations.

In order to properly recognize the digit, the speech recognition system has models for each of the possible names of the digits and adapts its models for each of the digits and for their multiple names. During adaptation, the word to be said is shown to the user and the user is asked to pronounce it. For digits, this may be done in a number of ways. Usually, the digits may be presented as a string of numbers. If the digits are to be used for digit dialing, it may be desirable to present the numbers in phone number format. However, this is difficult for digits since some of them are single word digits and others are multi-word digits. For example, the phone number 03-642-7242 has a "0" which is a multi-word digit in English and many "2"s, which is a multi-word digit in German.

FIG. 1, to which reference is now made, shows one example of how the above phone number might be presented to a user for pronouncing during adaptation. For an English speaking user, the following might be displayed:

"zero 3-642-7242"

If the same number was to be used for a German speaker, the same phone number might be displayed as follows:

"03-64 zwei-7 zwei 4 zwei"

These presentations are uncomfortable for users as they are not used to seeing their digits written out in full. Because of this confusion, the user might not pronounce the digit sufficiently close to the way s/he pronounces it normally and thus, the adaptation will be poor.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1 is a schematic illustration of a prior display of symbols to be said;

FIG. 3 is a schematic illustration of an exemplary display, useful in understanding the operation of the system of FIG. 2;

Figure 2:
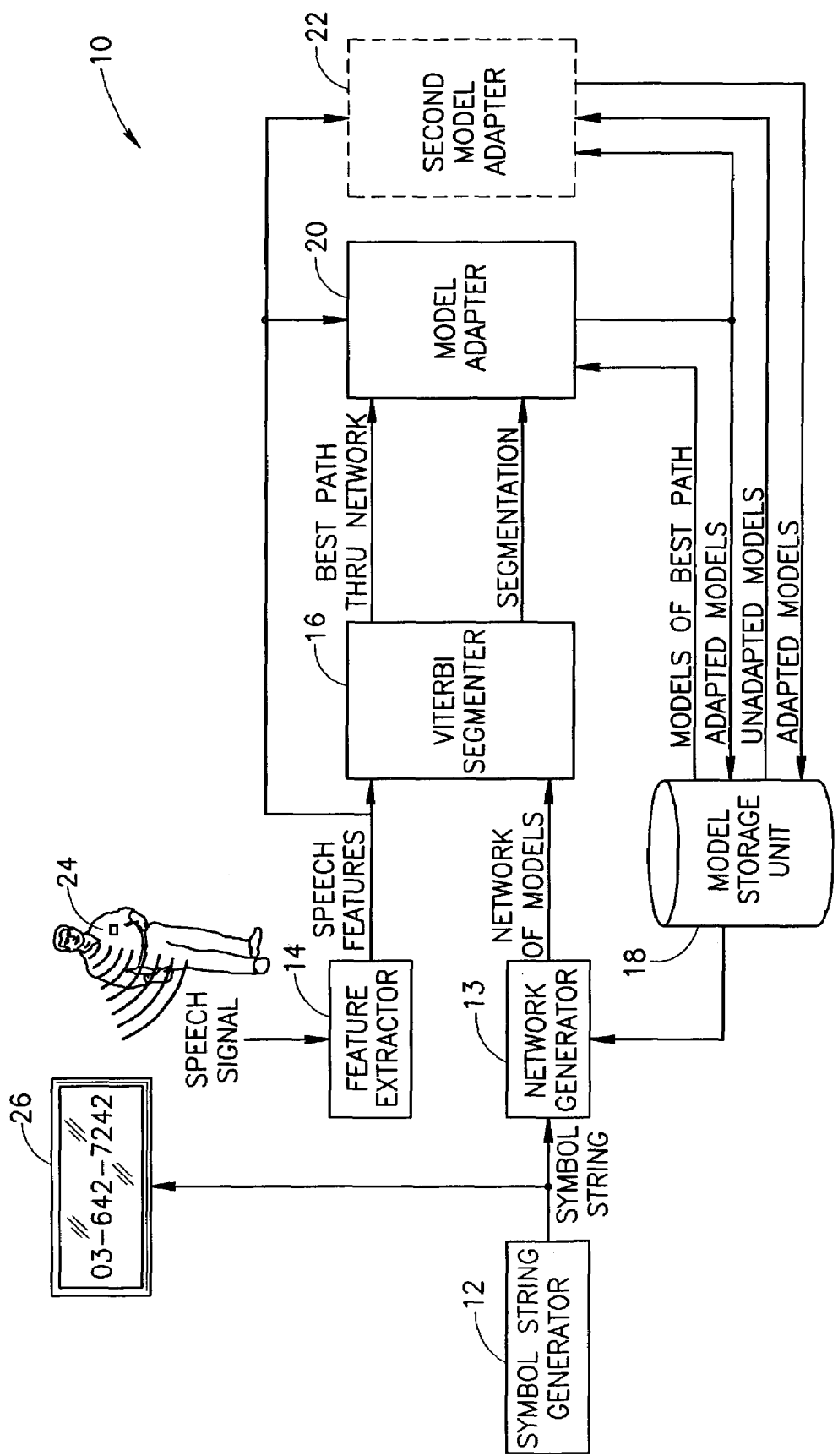
FIG. 2 is a block diagram illustration of a system for adapting models of spoken symbols, constructed and operative in accordance with an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Reference is now made to FIG. 2, which illustrates an adaptation system 10, constructed and operative in accordance with an embodiment of the present invention, for adapting multi-word symbols by displaying only the symbol itself. During adaptation, the present invention may display symbols to be adapted as symbols and may ask the user to say the word for the displayed symbol.

In the present invention, the term "symbol" refers to any symbol used in writing, such as digits, letters, math symbols and any of the symbols which are present on a keyboard. Many of these symbols have multiple words referring to them. For example, the symbol "#" is called "number", "hash" or "pound" in English. The symbol "z" is pronounced "zee" in American English and "zed" in British English. The symbol "0" is called "zero" and "oh" in English.

In accordance with an embodiment of the present invention, for multi-word symbols, the user may not be restricted to using a particular one of the multiple words for the symbol. Thus, if the symbol "#" is displayed, the user may say "number", "hash" or "pound", as he chooses. System 10 may then recognize the word as one of the multiple words for the symbol and may adapt the relevant word accordingly. System 10 may allow the user to say any of the possible words or may limit the user to a subset of meanings (e.g. "hash" and "pound" but not "number").

System 10 may comprise a symbol string generator 12, a network generator 13, a feature extractor 14, a Viterbi segmenter 16, a model storage unit 18, a model adapter 20 and an optional, second model adapter 22. Symbol string generator 12 may generate a string of symbols to be displayed to a user 24 on a display 26. The string may be a predefined string or it may be generated when the rest of the recognition system (not shown) has trouble recognizing a particular word that user 24 recently said or at any other time that there are poor recognition results.

Symbol string generator 12 may provide the symbols to be said to display 26 as symbols (rather than as words) and may also provide the symbol string to network generator 13 which may generate therefrom a network of models, from the models in model storage unit 18, which represents the string of symbols to be said. In accordance with an embodiment of the present invention, network generator 13 may allow partial unsupervised adaptation for any multi-word symbol among the symbols to be said (limited to the possible ways to say the particular symbol). Accordingly, the network of models may include in it multiple models for any multi-word symbol.

It will be appreciated that the term "models" includes a single model for a word or multiple sub-word models that, together, provide a model for a word.

Figure 3:
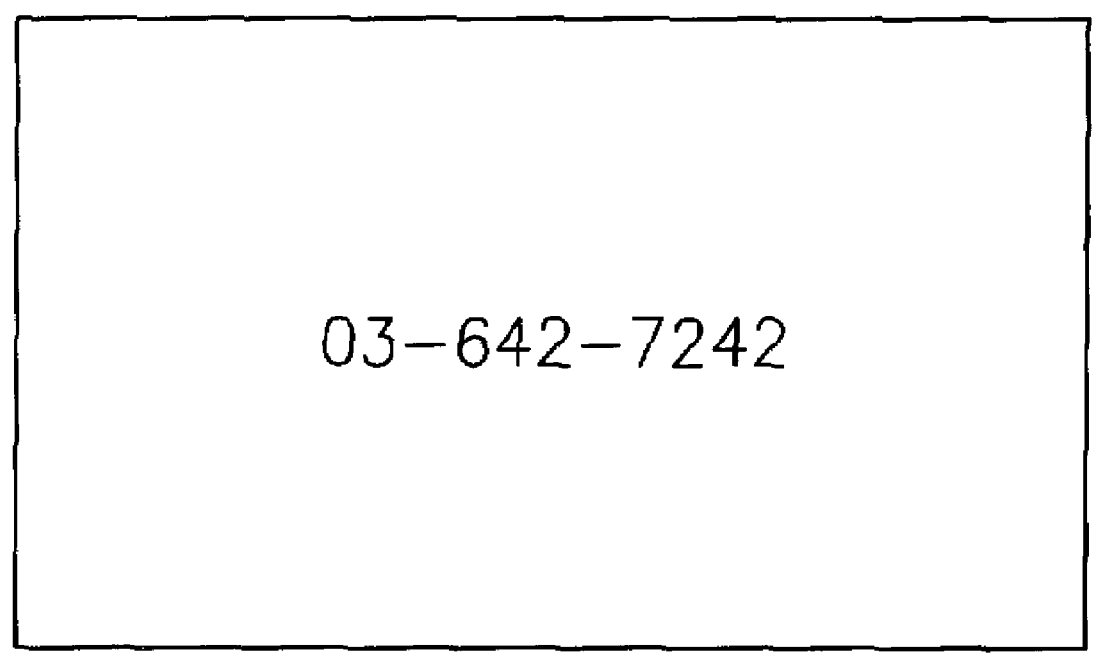
Figure 4A:
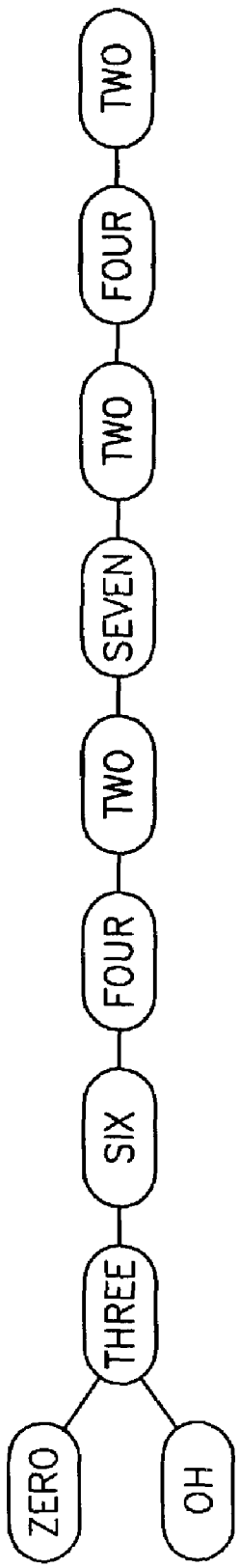
FIG. 4A is a schematic illustration of an exemplary network of English models, corresponding to the display of FIG. 3, useful in understanding the operation of the system of FIG. 2.
Figure 4B:
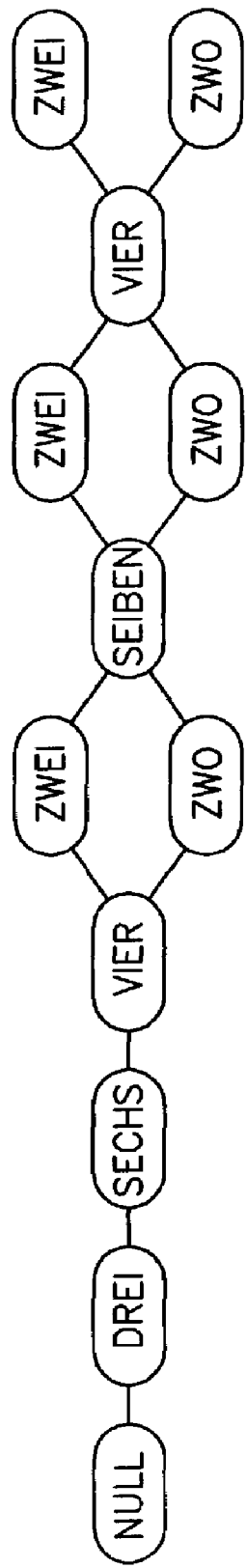
FIG. 4B is a schematic illustration of an exemplary network of German models, corresponding to the display of FIG. 3, useful in understanding the operation of the system of FIG. 2.

FIGS. 3, 4A and 4B, to which reference is now briefly made, illustrate an exemplary display (FIG. 3) and its associated network of models in English (FIG. 4A) and German (FIG. 4B). The phone number of FIG. 3 is the same as that for prior art FIG. 1. However, in the present invention, the phone number is presented in its natural way, e.g.

"03-642-7242"

User 24 may be asked to say, in English, what is displayed. Whether user 24 chooses to say "oh" or "zero" for the first digit ("0") is his decision; the present invention can handle both, as will be described in more detail hereinbelow. For German, the user may choose to pronounce the multiple 2s as all "zwei", all "zwo" or some combination thereof.

For each display, network generator 13 may generate a network of models corresponding to the words that user 24 is expected to say. For multi-word symbols, multiple models may be connected in parallel. For example, FIGS. 4A and 4B show the networks for the phone number of FIG. 3, where the network of FIG. 4A is for the English pronunciation of the phone number while the network of FIG. 4B is for the German pronunciation.

The network of FIG. 4A has multiple models for "0", "zero" and "oh", which are connected in parallel to the model for "three". In the network of FIG. 4B, the multiple models for "2" are connected in parallel to "vier", "sieben" and "vier", in order. All of the nodes are connected with directed edges from one node to the next. Thus, the first node for "vier" in FIG. 4B has two directed edges connecting to each of the two words for the multi-word symbol of "2" and the node for "sieben" has two directed edges coming from each of the two words of the multi-word symbol.

Figure 4C:
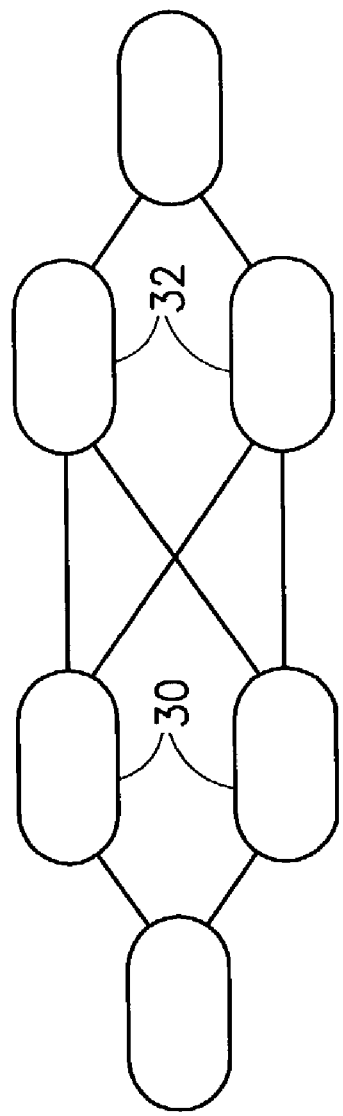
FIGS. 4C and 4D are schematic illustrations of exemplary networks having two consecutive multi-word symbols.
Figure 4D:
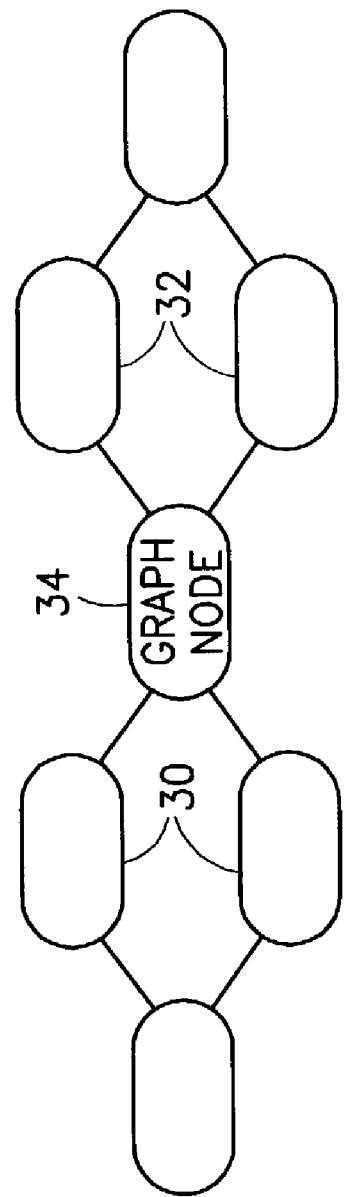

FIGS. 4C and 4D show blank exemplary networks indicating the connections when there are two, consecutive, multi-word symbols. Although FIGS. 4C and 4D show two-word symbols, the ideas presented therein are applicable to symbols that have more than two words. In the network of FIG. 4C, each of the words 30 of the first multi-word symbol are connected to each of the words 32 of the second multi-word symbol. This generates a fairly complicated network. In the network of FIG. 4D, each of the words 30 of the first multi-word symbol are connected to a graph node 34 which, in turn, is connected to each of the words 32 of the second multi-word symbol. This network is much simpler. Both types of networks are possible and are incorporated in the present invention.

Returning to FIG. 2, network generator 13 may generate the network of models for the words user 24 is expected to say. Feature extractor 14 may take the actual speech of user 24 and may generate therefrom the features describing the speech. These features may be the same type as those used to generate the models stored in model storage 18. There are many types of feature extractors, any one of which may be included in the present invention.

Viterbi segmenter 16 may compare the features of the speech with the features present in the network of models provided to it from network generator 13 and may produce N best paths through the network, where N is often 1 but may be larger, as well as N segmentations of the speech into segments that correspond to the segments of the models in N best paths. It will be appreciated that each path includes in it only one of the multiple words of a multi-word symbol. Viterbi segmenters are well-known and therefore, will not be discussed herein; one discussion of them can be found in the book, *Spoken Language Processing*, by Huang, Acero, and Hon, pp. 608-612.

Model adapter 20 may utilize the output of Viterbi segmenter 16 (i.e. the N best paths through the network and their segmentations), the feature data of the incoming speech signal produced by feature extractor 14 and the models of the best path to update the models of the N paths to user 24's way of speaking. The updated models may be added into model storage unit 18 or they may replace the previous models. Model adaptation is well-known and therefore, will not be discussed herein; the following articles and books discuss many types of speaker adaptation, any one of which may be included in the present invention:

P. C. Woodland, "Speaker Adaptation: Techniques And Challenges", *Proc. IEEE Workshop on Automatic Speech Recognition and Understanding*, 2000, pp.85-90.

P. C. Woodland, "Speaker Adaptation for Continuous Density HMMs: A Review", *Adaptation Methods for Automatic Speech Recognition*, August 2001, pp. 11-19.

M. J. F. Gales and P. C. Woodland, "Mean And Variance Adaptation Within The MLLR Frame Work", *Computer Speech & Language*, Vol. 10, pp. 249-264, 1996.

*Automatic Speech And Speaker Recognition—Advanced Topics*, edited by Chin-Hui Lee, Frank K. Soong, Kuldip K. Paliwal, Chapter 4, section 3, pp. 88-90.

It is possible that user 24 might not say all of the multiple words of a multi-word symbol during the adaptation process but yet he might use the non-spoken words during actual speech. To accommodate this, the initial models of the non-spoken words may be used or they may be adapted in one of two ways; as part of the adaptation process or in an additional adaptation operation designed to improve the non-spoken models. For the latter, system 10 additionally may comprise optional second model adapter 22.

In one example, model adapter 20 may perform maximum a posteriori adaptation (MAP) and adapts only the models of spoken words and second model adapter 22 may perform maximum likelihood linear regression (MLLR) adaptation on the non-adapted models using models of symbols or of any other adapted model stored in storage unit 18 to provide some speaker adaptation to the non-adapted symbol models. In another example, model adapter 20 may perform MLLR adaptation on the entire model set with whatever words are spoken. MAP and MLLR adaptation are described in the articles mentioned hereinabove.

Figure 5A:
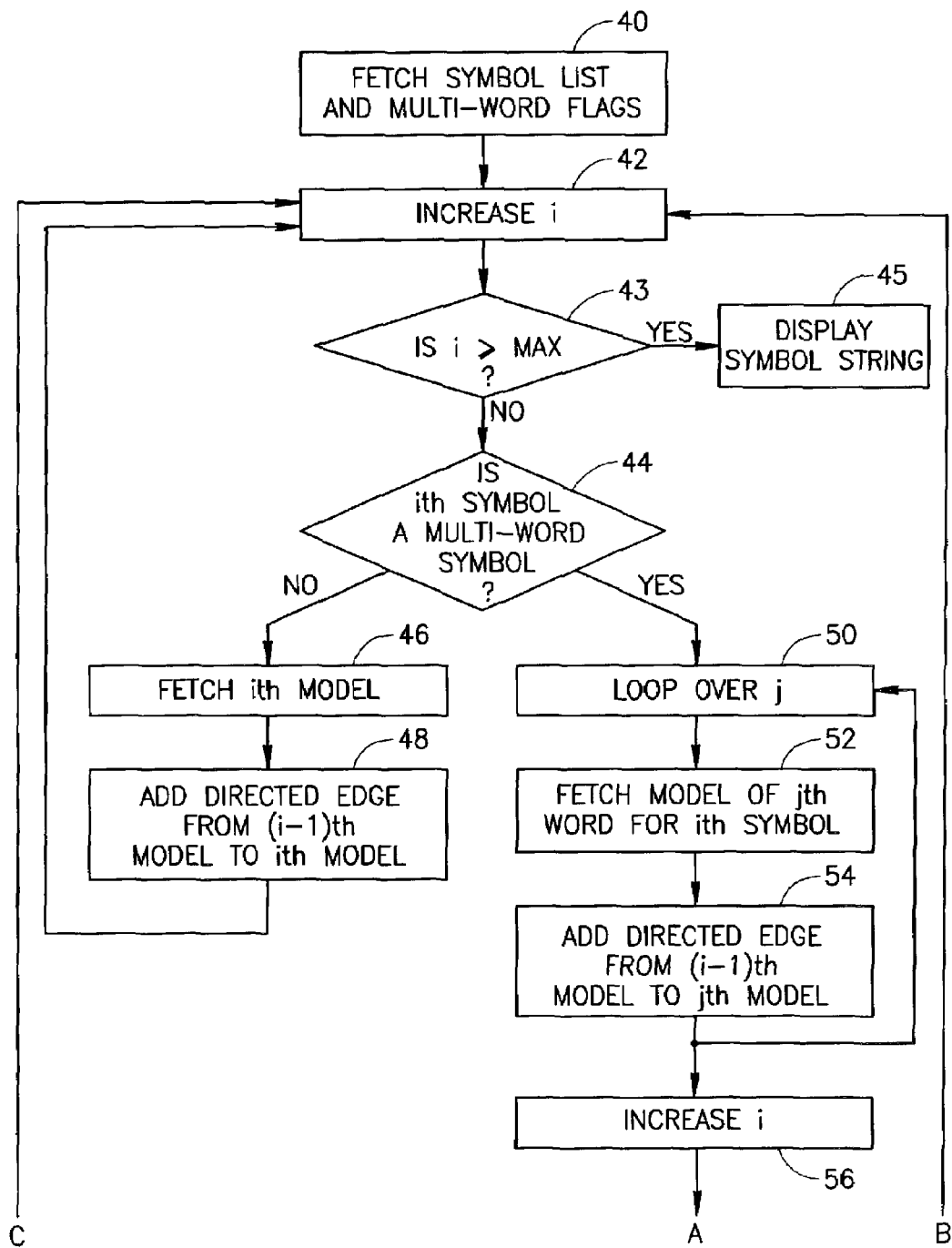
FIGS. 5A and 5B together are a flow chart illustration of the operations of a network generator forming part of the system of FIG. 2.
Figure 5B:
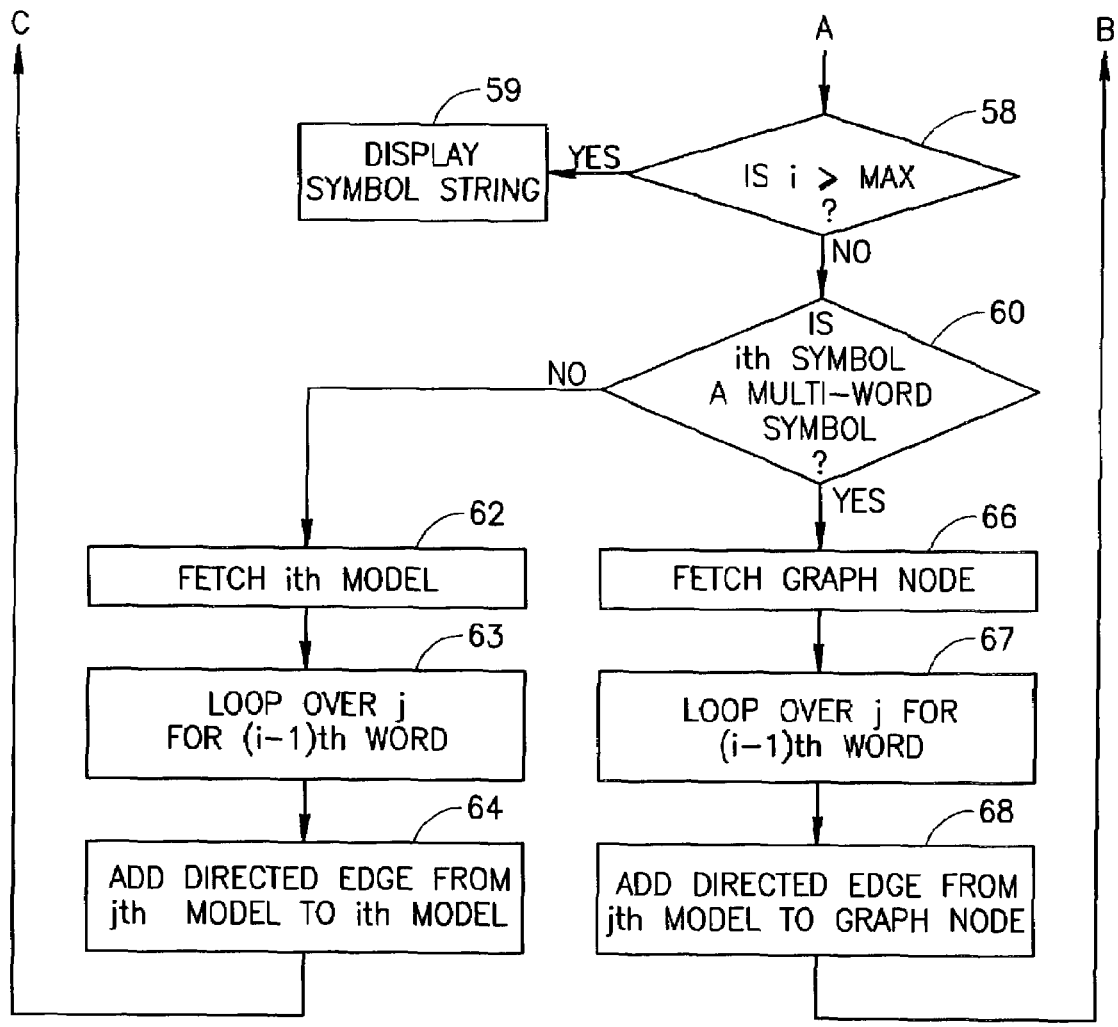

Reference is now made to FIGS. 5A and 5B, which together illustrate, in flow chart format, the operations of one exemplary network generator 13 to generate a network of models for a given display. The operations may be similar to those performed to generate directed graphs.

In step 40, network generator 13 may fetch a previously stored symbol list for symbols user 24 should say. The symbol list may include multi-word flags for those symbols having more than one word associated therewith.

In step 42, the symbol number i may be increased which, at first, brings i to 1, after which there is a check (step 43) that i has not reached its maximum. If it has, then the symbol string is displayed (step 45). If it has not, then there may be a branch 44 depending on whether or not the i-th symbol is a multi-word or a single word symbol. For single word symbols, the i-th model may be fetched (step 46) and a directed edge may be added (step 48) to connect the i-th model with the previous (i−1)th model (as is known in the art of directed graphs). The process returns to step 42 and the symbol number may be increased by 1.

For multi-word symbols, the models j for each word of the i-th symbol may be brought and connected, in parallel, to the previous model. A loop 50 may be performed during which the model of the j-th word of the i-th symbol may be fetched (step 52) and a directed edge may be added between the j-th model and the (i−1)th model.

After loop 50, symbol number i may be increased (step 56) and may be checked (step 58) to see if it has reached its maximum. If so, the process for generating the network may be stopped and the symbol string may be displayed (step 59). After this, feature extractor 14 (FIG. 2) may begin operating on the speech of user 24.

If the symbol list has not yet ended, then the next symbol may be fetched and connected to the previous multi-word symbol. If the next symbol is a single word symbol (as checked in step 60), then network generator 13 may fetch (step 62) the ith model and may connect it (step 64 and its loop 63) to each model of the previous symbol. If the next symbol is a multi-word symbol (step 60), then network generator 13 may fetch (step 66) a graph node (as described with respect to the network of FIG. 4D) and may connect it (step 68 and its loop 67) to each model of the previous symbol. For the network of FIG. 4C, each of the models of the next symbol may be connected to each model of the previous symbol.

In accordance with an embodiment of the present invention, system 10 may allow a user to speak in more than one language. In this embodiment, some or all of the symbols have more than one set of models associated therewith, one set for one language and one set for another language. This may be particularly useful for multi-lingual users.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A speaker adaptation system comprising:
   a storage unit which stores at least reference speech models of symbols; and
   a network generator in communication with said storage unit which generates a network of models for a speaker adaptation session corresponding to a series of symbols presentable to a user during said session, said network of models comprising: multiple models for at least one multi-word symbol and models from more than one language; and
   a model adapter which adapts at least a portion of said reference speech models from at least a portion of speech from said user.

2. A system according to claim 1 and also comprising a second model adapter which adapts models not adapted by said first model adapter using at least a portion of otherwise available models.

3. A speaker adaptation system comprising:
   a symbol string generator which generates a series of symbols presentable to a user during a speaker adaptation session, where a multi-word symbol is presented as a symbol; and
   an adaptation network generator which generates a network of models corresponding to said series of symbols, said network of models comprising models from more than one language.

4. A system according to claim 3 and also comprising a recognizer which matches a speech signal of a user saying said series of symbols with a portion of models in said network and a model adapter which adapts at least said portion of models using at least a portion of said speech signal.

5. A system according to claim 4 and also comprising a second model adapter which adapts models not adapted by said first model adapter using at least a portion of otherwise available models.

6. A speaker adaptation system comprising:
   means to display symbols to a user during a speaker adaptation session, wherein a multi-word symbol to be spoken is displayable as a symbol; and
   an adaptation network generator which generates a network of models corresponding to a series of symbols to be said, said network of models comprising models from more than one language.

7. A system according to claim 6 and also comprising a recognizer which matches a speech signal of a user saying said series of symbols with a portion of models in said network and a model adapter which adapts at least said portion of models using at least a portion of said speech signal.

8. A system according to claim 7 and also comprising a second model adapter which adapts models not adapted by said first model adapter using at least a portion of otherwise available models.

9. A speaker adaptation system for speech models of a set of symbols presentable to a user during a speaker adaptation session, the system comprising:
   an unsupervised adaptation functionality for multi-word symbols of said set of symbols, limited to a set of words associated with each multi-word symbol; wherein said set of words includes words from more than one language;
   a supervised adaptation functionality for single word symbols of said set of symbols; and
   a model adapter which adapts at least a portion of said speech models from at least a portion of speech from said user.

10. A system according to claim 9 and comprising a symbol string generator which generates a series of symbols to be said, where a multi-word symbol is presented as a symbol.

11. A system according to claim 9 and comprising an adaptation network generator which generates a network of models corresponding to a series of symbols to be said, said network of models comprising multiple models for at least one multi-word symbol.

12. A system according to claim 9 and also comprising a model adapter which adapts models not adapted by said functionalities using at least a portion of otherwise available models.

13. A computer-implemented method in which a computer system initiates execution of software instructions stored in memory for speaker adaptation, the computer-implemented method comprising:
generating a network of reference speech models corresponding to a series of symbols presentable to a user during a speaker adaptation session, said network of models comprising: multiple models for at least one multi-word symbol and models from more than one language;
storing, in a storage unit, said network of reference speech models corresponding to said series of symbols; and
adapting at least a portion of said reference speech models from at least a portion of speech from said user.

14. A computer-implemented method according to claim 13 and also comprising adapting models not adapted in said first step of adapting using at least a portion of otherwise available models.

15. A computer-implemented method in which a computer system initiates execution of software instructions stored in memory for speaker adaptation, the computer-implemented method comprising:
generating a series of symbols to be presentable to a user during a speaker adaptation session, where a multi-word symbol is presented as a symbol;
generating a network of models corresponding to said series of symbols, said network of models comprising models from more than one language; and
storing, in a storage unit, said network of models corresponding to said series of symbols.

16. A computer-implemented method according to claim 15 and also comprising matching a speech signal of a user saying said series of symbols with a portion of models in said network and adapting at least said portion of models using at least a portion of said speech signal.

17. A computer-implemented method according to claim 16 and also comprising adapting models not adapted in said first step of adapting using at least a portion of otherwise available models.

* * * * *